(12) United States Patent
Su et al.

(10) Patent No.: US 8,711,718 B2
(45) Date of Patent: Apr. 29, 2014

(54) METHOD AND APPARATUS FOR REDUCING POWER CONSUMPTION USED IN COMMUNICATION SYSTEM HAVING TIME SLOTS

(75) Inventors: Wei-Kun Su, Taipei (TW); Po-Chun Huang, Kaohsiung (TW); Yuan Chen, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 506 days.

(21) Appl. No.: 13/026,305

(22) Filed: Feb. 14, 2011

(65) Prior Publication Data
US 2012/0002561 A1    Jan. 5, 2012

Related U.S. Application Data

(60) Provisional application No. 61/361,426, filed on Jul. 4, 2010.

(51) Int. Cl.
*H04J 1/16* (2006.01)

(52) U.S. Cl.
USPC .......................................... 370/252

(58) Field of Classification Search
USPC ................. 370/252, 254, 386, 255, 232, 342, 370/217–220; 455/561, 67.1, 522, 127
See application file for complete search history.

(56) References Cited

U.S. PATENT DOCUMENTS

| 5,241,568 | A | | 8/1993 | Fernandez |
| 5,384,564 | A | * | 1/1995 | Wycoff et al. ............... 340/7.35 |
| 5,666,355 | A | * | 9/1997 | Huah et al. .................... 370/311 |
| 6,223,056 | B1 | * | 4/2001 | Appel ............................ 455/561 |
| 7,151,759 | B1 | | 12/2006 | Ryan |
| 7,162,279 | B2 | * | 1/2007 | Gupta ............................ 455/574 |
| 8,315,340 | B1 | * | 11/2012 | Kim ............................... 375/340 |
| 2007/0026893 | A1 | | 2/2007 | Sakamoto |
| 2007/0189259 | A1 | | 8/2007 | Sollenberger |

FOREIGN PATENT DOCUMENTS

CN    1799103 A    7/2006

* cited by examiner

*Primary Examiner* — Chi Pham
*Assistant Examiner* — Alexander O Boakye
(74) *Attorney, Agent, or Firm* — Winston Hsu; Scott Margo

(57) ABSTRACT

An apparatus used in a communication system having a plurality of time slots includes a signal processing circuit, a signal detector, and a controlling circuit. The signal processing circuit receives an input signal. The signal detector detects the input signal to generate a detection result. The controlling circuit controls the signal processing circuit according to the detection result. When the detection result does not meet a predetermined criterion, the controlling circuit adjusts the signal processing circuit for reducing power consumption of the signal processing circuit.

17 Claims, 5 Drawing Sheets

US 8,711,718 B2

METHOD AND APPARATUS FOR REDUCING POWER CONSUMPTION USED IN COMMUNICATION SYSTEM HAVING TIME SLOTS

CROSS REFERENCE TO RELATED APPLICATIONS

This application claims the benefit of U.S. Provisional Patent Application No. 61/361,426, filed Jul. 4, 2010, the contents of which are hereby incorporated by reference.

BACKGROUND

The invention relates to a power saving scheme, and more particularly to an apparatus and a method, used in a communication system having a plurality of time slots, for reducing power consumption.

For a conventional communication system, when a communication device is linked to another communication device, the communication device knows the preserved timing slots for another communication device to transmit a signal such as packetized data. It is required for the communication device to 'listen' whether any data/signal arrives at this timing. The operation of repeatedly listening to check whether a signal/data arrives consumes a large amount of power.

SUMMARY

It is therefore one of the objectives of the present invention to provide an apparatus and a method for reducing power consumption used in a communication system having a plurality of time slots, to solve the above-mentioned problems.

According to an embodiment of the present invention, an apparatus used in a communication system having a plurality of time slots is disclosed. The apparatus comprises a signal processing circuit, a signal detector, and a controlling circuit. The signal processing circuit is utilized for receiving an input signal. The signal detector is coupled to the signal processing circuit and utilized for detecting the input signal to generate a detection result. The controlling circuit is coupled to the signal processing circuit and the signal detector, and utilized for controlling the signal processing circuit according to the detection result. When the detection result generated based on the input signal does not meet a predetermined criterion, the controlling circuit is arranged to adjust the signal processing circuit for reducing power consumption of the signal processing circuit.

According to another embodiment of the present invention, a method used in a communication system having a plurality of time slots is disclosed. The method comprises: using a signal processing circuit to receive an input signal; detecting the input signal to generate a detection result; and adjusting the signal processing circuit for reducing power consumption of the signal processing circuit when the detection result generated based on the input signal does not meet a predetermined criterion.

According to an embodiment of the present invention, a method used in a communication system having a plurality of time slots comprises: using a signal processing circuit to receive an input signal; and when a detection result generated based on the input signal during a first portion of a time slot does not meet a predetermined criterion, adjusting the signal processing circuit in order not to receive the input signal during a second portion of the time slot.

As mentioned above, by reducing the power consumption of the signal processing circuit during the second portion of the time slot, power can be effectively saved.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
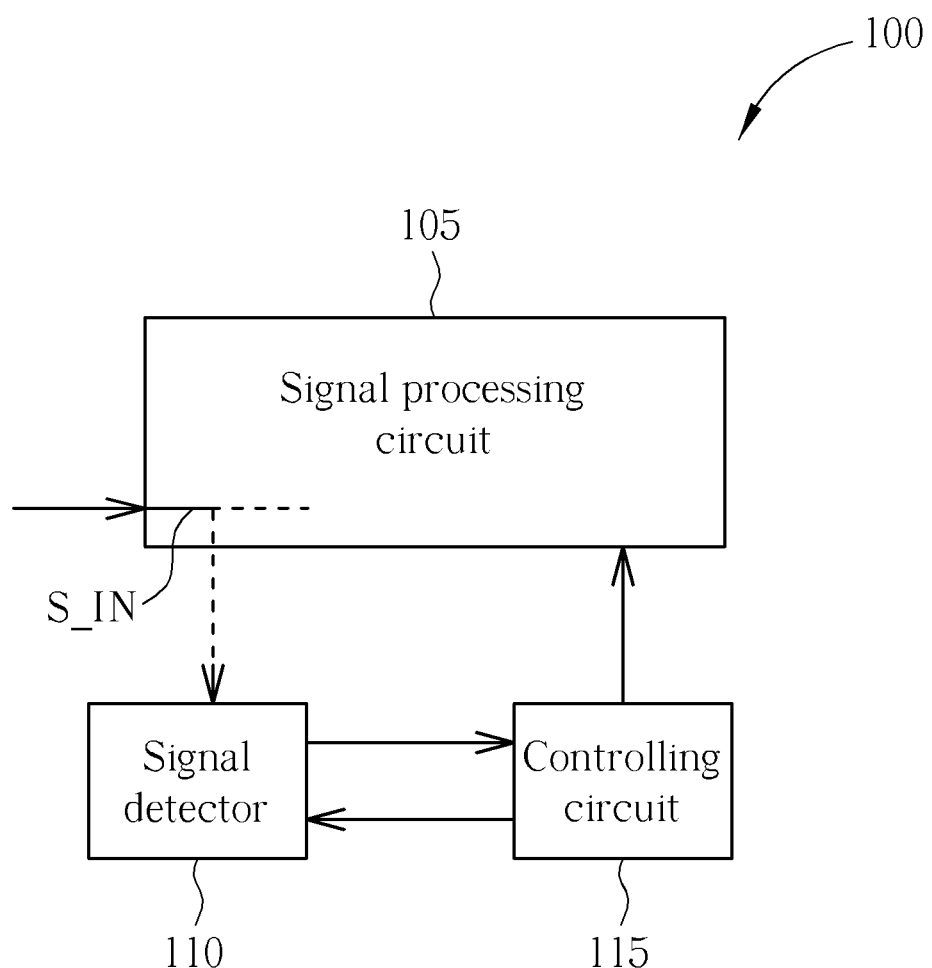
FIG. 1A is a block diagram of an apparatus used in a communication system having a plurality of time slots according to a first embodiment of the present invention.

Please refer to FIG. 1A, which illustrates a block diagram of an apparatus 100 used in a communication system having a plurality of time slots according to a first embodiment of the present invention. The apparatus 100 is used in a communication system such as a wireless communication system, e.g. Bluetooth communication system (which may conform to Bluetooth, Bluetooth Low Energy or Bluetooth High Speed specifications), GSM (Global System for Mobile Communications) communication system, or WCDMA (Wideband Code Division Multiple Access) communication system, etc. The apparatus 100 is configured as a receiver, a transmitter, or a transceiver. For example, in the Bluetooth communication system, the apparatus 100 can be configured as a master device or can be also configured as a slave device. When the apparatus 100 is the master device, the apparatus 100 at certain time slots is arranged to listen whether a signal is arriving; the signal may be transmitted from a slave device. When the apparatus 100 is the slave device, the apparatus 100 at another certain time slot is arranged to listen whether a signal arrives; the signal may be transmitted from a master device. The operation of listening to whether a signal is arriving and is sent from another communication device relates to receiving an input signal and then detecting the received input signal. Thus, whether the apparatus 100 is a master device or a slave device, the apparatus 100 is arranged to receive an input signal at a specific time slot and detect the received input signal. That is, the specific time slot is used by the apparatus 100 to check/listen whether any following data/signal transmitted from another communication device is arriving. In order to save more power, under some conditions, the apparatus 100 is configured to de-activate the operation of listening in advance.

Figure 2:
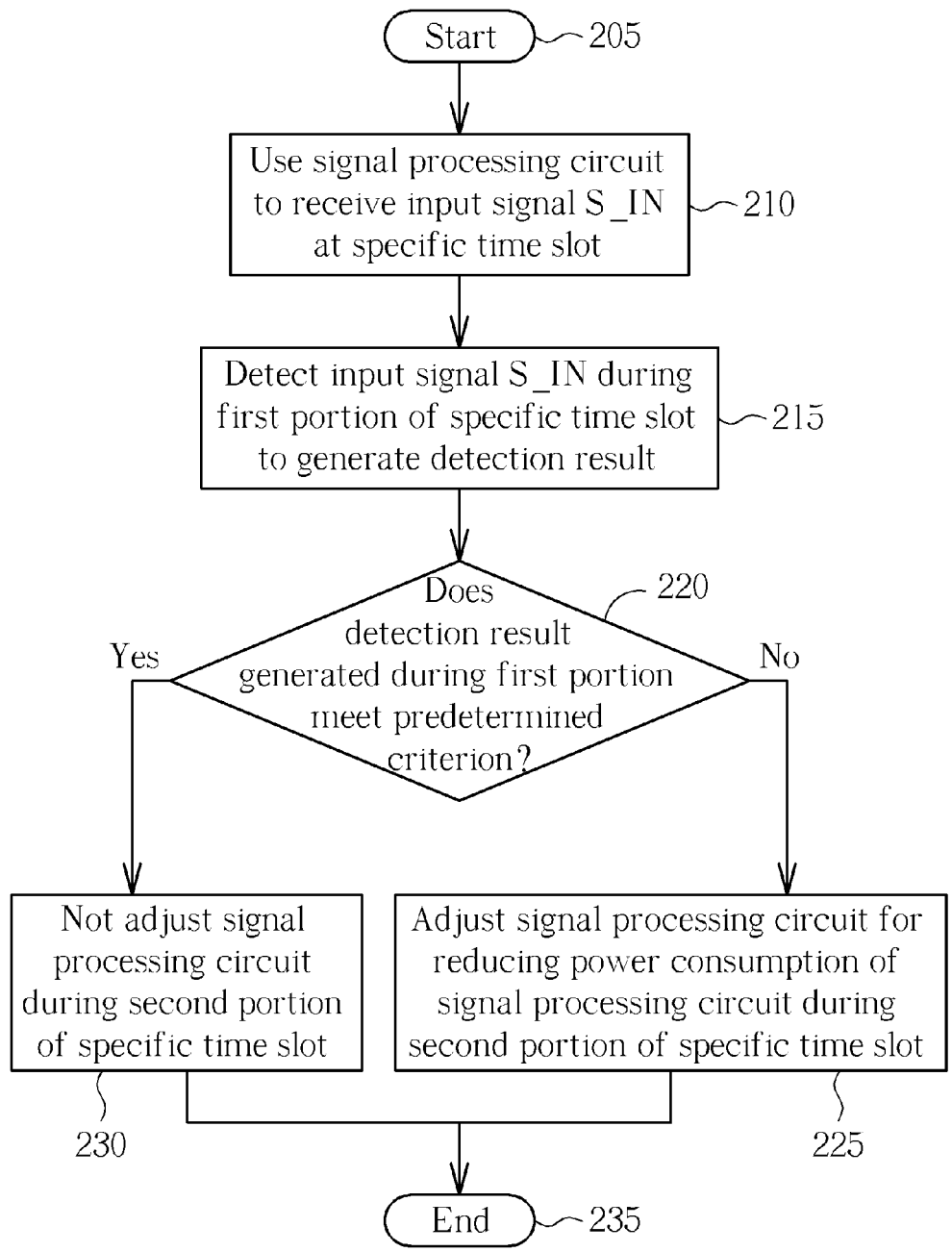
FIG. 2 is a flowchart illustrating the operation of the apparatus shown in FIG. 1.

Please refer to FIG. 1A in conjunction with FIG. 2. FIG. 2 is a flowchart illustrating the operation of the apparatus 100 as shown in FIG. LA. The apparatus 100 comprises a signal processing circuit 105, a signal detector 110, and a controlling circuit 115. The signal processing circuit 105 is utilized for receiving an input signal S_IN at the specific time slot (Step 210). The signal detector is coupled to the signal processing circuit 105 and utilized for detecting the input signal S_IN to generate a detection result. The controlling circuit 115 is coupled to the signal processing circuit 105 and the signal detector 110, and is utilized for controlling the signal processing circuit 105 according to the detection result generated by the signal detector 110. In practice, the signal processing circuit 105 can be any one circuit element of an antenna unit for receiving the input radio-frequency signal, a radio-frequency signal processing circuit coupled to the output of the antenna unit, a down converter coupled to the radio-frequency signal processing circuit, an analog-to-digital converter (ADC) coupled to the down converter, and a digital signal processing circuit coupled to the ADC, etc, where the digital processing circuit may comprises a demodulator. Also, the signal processing circuit 105 may include two or more of these circuit elements mentioned above. The signal processing circuit 105 may, in some cases, include all of these circuit elements.

Figure 1B:
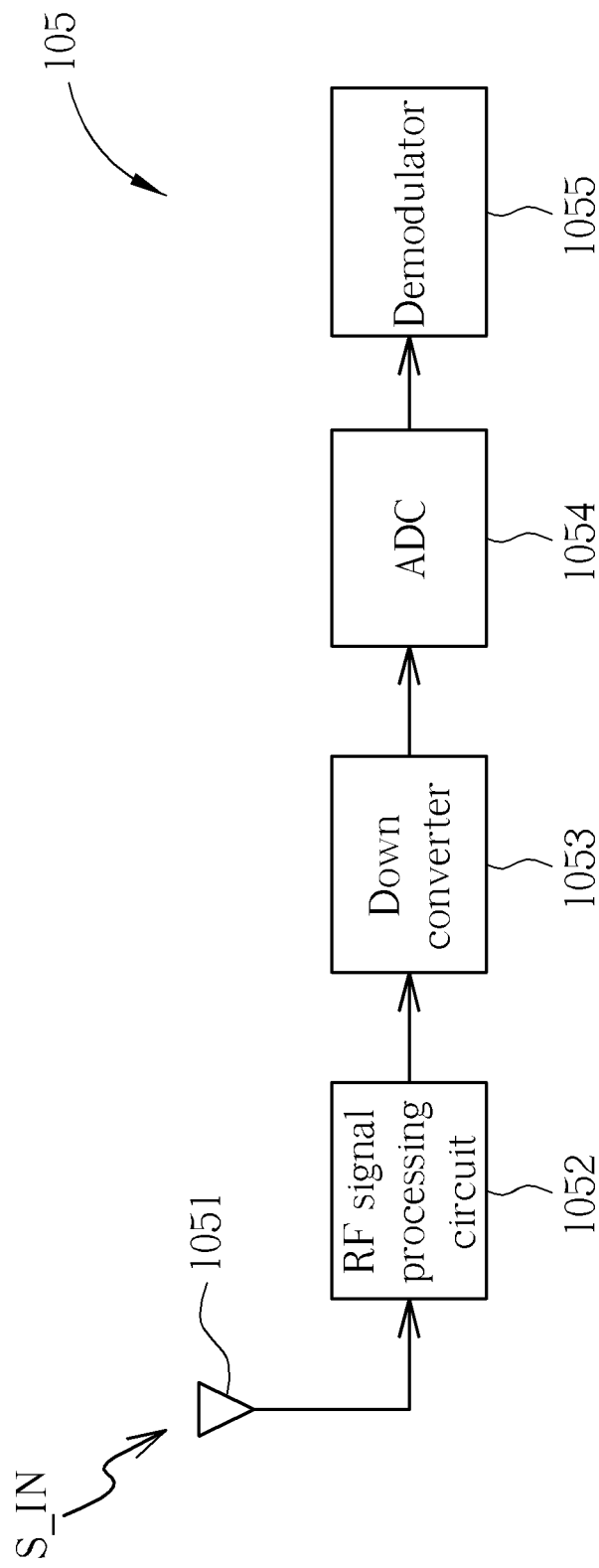
FIG. 1B is a block diagram of an embodiment of the signal processing circuit as shown in FIG. 1A.

Please refer to FIG. 1B, which illustrates a block diagram of an embodiment of the signal processing circuit 105 as shown in FIG. 1A. The signal processing circuit 105 comprises a plurality of stages such as an antenna unit 1051, an RF signal processing circuit 1052, a down converter 1053, an ADC 1054, and a demodulator 1055. The input signal S_IN received by the signal processing circuit 105 at the specific time slot is processed by the above-mentioned circuit elements included within the signal processing circuit 105. That is, the input signal S_IN equivalently passes through the above-mentioned circuit elements in turn. The signal detector 110 may generate the detection result at any stage, i.e. based on any signal inputted to/outputted from a certain circuit element of the above-mentioned circuit elements. For example, the detection can be performed based on the RF signal, the baseband signal or the digital signal. The modifications of the signal processing circuit 105 all fall within the scope of the present invention.

As described above, the specific time slot is used to check whether the received input signal S_IN is data/signal sent from another communication device. That is, it is necessary for a conventional communication device to operate during a full specific time slot to determine whether the received input signal is a desired data/signal, and only after the determination is made (i.e. after the full specific time slot expires) can the conventional communication device move to subsequent process. In contrast, the apparatus 100 regards the specific time slot as a slot at least including (but is not limited to) a first portion and a second portion following the first portion. That is, the specific time slot may be composed of the first and second portions, or may be composed of the first and second portions and another portion(s). The signal detector 110 is arranged to detect the input signal S_IN during the first portion of the specific time slot to generate the detection result (Step 215). The controlling circuit 115 then compares the detection result with a predetermined criterion. If the detection result generated during the first portion does not meet the predetermined criterion (Step 220), the controlling circuit 115 is arranged to adjust the signal processing circuit 105 for reducing power consumption of the signal processing circuit 105 during the second portion of the specific time slot (Step 225). Otherwise, if the detection result generated during the first portion meets the predetermined criterion (Step 220), then the controlling circuit 115 will not adjust the signal processing circuit 105 during the second portion of the specific time slot (Step 230).

When the detection result does not meet the predetermined criterion, the controlling circuit 115 is arranged to decrease or turn off power provided to the signal processing circuit 105 during the second portion of the specific time slot, to save more power. Decreasing or turning off the power provided to the signal processing circuit 105 during the second portion of the specific time slot indicates reducing the whole power consumption by de-activating or turning off the signal processing circuit 105 earlier when the signal processing circuit 105 is not required to receive any following signal during the second portion of the specific time slot. Otherwise, when the detection result exactly meets the predetermined criterion, the controlling circuit 115 is not arranged to decrease or turn off the provided power.

In practice, for decreasing or turning off the power, the controlling circuit 115 can de-activate one or more signal processing functions of the signal processing circuit 105 during the second portion of the specific time slot. For instance, if the signal processing circuit 105 is an analog-to-digital converter (ADC), then the controlling circuit 115 can de-activate a reception function of the ADC for receiving the input signal S_IN, an analog-to-digital conversion function of the ADC for converting the received input signal S_IN, or an output function of the ADC for outputting the processed input signal into a following stage circuit. The de-activation of at least one signal processing function can also be applied to other circuit elements such as the antenna unit, the radio-frequency signal processing circuit, the down converter, the digital signal processing circuit, or the demodulator, etc. For brevity, similar descriptions are not detailed again.

By de-activating one or more signal processing functions during the second portion of the specific time slot, the power provided to the signal processing circuit 105 can be decreased so as to save power. The reduction of power consumption of the signal processing circuit 105 can also be achieved by simply decreasing the provided power without disabling any signal processing function. In other words, all the signal processing functions of the signal processing circuit 105 in this situation are still activated, and the only difference is that the power provided to the signal processing circuit 105 is decreased. Additionally, for saving more power, when the detection result does not meet the predetermined criterion, the controlling circuit 105 can further adjust other circuit elements to reduce total power consumption during the second portion of the specific time slot. For instance, the controlling circuit 115 is further arranged to adjust the signal detector 110 for reducing power consumption of the signal detector 110 during the second portion of the time slot, or to self-adjust the controlling circuit 115 for reducing more power consumption. The above modifications all obey the spirit of the present invention.

In a first embodiment of the present invention, the predetermined criterion relates to a predetermined threshold value TH_1 that corresponds to a minimum acceptable value for the signal processing circuit 105 to successfully receive or decode the input signal S_IN. The signal detector 110 is arranged to detect a received signal indicator such as signal strength of the input signal S_IN during the first portion of the specific time slot for generating the detection result. In practice, the signal detector 110 is configured to detect the power or magnitude of the input signal S_IN to generate the detection result. The generated detection result preferably relates to a received signal strength indicator (RSSI), i.e. the measurement of the received power; however, this is not intended to be a limitation of the present invention. The controlling circuit 115 is arranged to check whether the detection result (i.e. the RSSI value) is stable, and then is arrange to compare the RSSI value with the predetermined threshold value TH_1 if such RSSI value is stable. If the detection result indicates that the signal strength detected during the first portion is smaller than the predetermined threshold value TH_1, then the controlling circuit 115 determines that the detection result does not meet the predetermined criterion, and is arranged to adjust the signal processing circuit 105 for reducing the power consumption of the signal processing circuit 105 during the second portion of the time slot. Since the detected signal strength is smaller than the predetermined threshold value TH_1 and any following signal cannot be successfully received, it is not required for the signal processing circuit 105 to listen whether any following signal arrives during the second portion of the specific time slot. That is, the signal processing circuit 105 does not need to receive any signal/data during the second portion of the specific time slot, so decreasing or turning off the provided power earlier can save more power.

In a second embodiment of the present invention, the predetermined criterion relates to a predetermined threshold value TH_2 that corresponds to a maximum acceptable noise value. The noise may include out-of-band (OOB) signal noise, environment noise, or natural noise, etc. although this is not meant to be a limitation of the present invention. The signal detector 110 is arranged to detect a received signal indicator such as signal strength of the input signal S_IN during the first portion of the specific time slot for generating the detection result. In practice, the signal detector 110 is configured to detect the power or magnitude of the input signal S_IN to generate the detection result. The generated detection result preferably relates to an RSSI, which is the measurement of the received power; however, this is not intended to be a limitation of the present invention. The controlling circuit 115 is arranged to check whether the detection result (i.e. the RSSI value) is stable, and then is arranged to compare the RSSI value with the predetermined threshold value TH_2 if such RSSI value is stable.

If the detection result indicates that the signal strength detected during the first portion is smaller than the predetermined threshold value TH_2, then the controlling circuit 115 determines that the detection result does not meet the predetermined criterion, and is arranged to adjust the signal processing circuit 105 for reducing the power consumption of the signal processing circuit 105 during the second portion of the time slot. The signal processing circuit 105 does not need to listen whether any following signal arrives during the second portion of the specific time slot when the detected signal strength is smaller than the predetermined threshold value TH_2 since in this situation any following signal may be easily affected by noise. This also indicates that the following signal cannot be successfully received by the signal processing circuit 105, and the signal processing circuit 105 does not need to receive the following signal during the second portion of the specific time slot. Therefore, power provided to the signal processing circuit 105 is decreased or turned off to save more power.

It should be noted that the predetermined threshold values TH_1 and TH_2 can be adjusted. For more performance improvement, predetermined threshold values TH_1 and TH_2 can be adaptively adjusted according to different operation conditions. This also follows the spirit of the present invention.

In a third embodiment of the present invention, the predetermined criterion relates to a predetermined preamble segment SEG_PRE. The signal detector 110 is arranged to detect a signal preamble included within the input signal S_IN at the specific time slot. The validity of the signal preamble indicates whether the following data/signal is valid or not. Since detecting the validity of the whole signal preamble would consume more power, the controlling circuit 115 is arranged to determine whether the whole signal preamble is invalid by determining whether a part of the signal preamble is valid. This part of the signal preamble may be the beginning part of the middle part, but this is not intended to be a limitation of the present invention. In this embodiment, the signal preamble at least includes a first preamble segment and a second preamble segment. That is, the signal preamble may be composed of the first and second preamble segments, or may be composed of the first and second preamble segments and another preamble segment(s).

The signal detector 110 is arranged to detect the first preamble segment during the first portion of the specific time slot for generating the detection result. The controlling circuit 115 then compares the detected first preamble segment with the predetermined preamble segment SEG_PRE to obtain a content match result corresponding to a content match error rate. The content match error rate is higher when the number of mismatch bits is greater. If the content match error rate between the detected first preamble segment and the predetermined preamble segment SEG_PRE is not smaller than an error threshold value (e.g. a bit error percentage), then the controlling circuit 115 determines that the detection result does not meet the predetermined criterion, and is arranged to adjust the signal processing circuit 105 for reducing the power consumption of the signal processing circuit 105 during the second portion of the specific time slot. It should be noted that the bit error percentage can be replaced by a bit error number or other error measurement indicator. This is not meant to be a limitation of the present invention.

Taking the Bluetooth communication system as an example, in practice, the signal preamble is a synchronization word. The signal detector 110 is arranged to detect a segment (i.e. the first preamble segment) of the synchronization word, and the controlling circuit 115 is arranged to perform content match upon the detected first preamble segment and the predetermined preamble segment SEG_PRE for calculating a content match error rate. If the content match error rate is not smaller than the error threshold value, then this indicates that the whole signal preamble (i.e. the received synchronization word) is not matched to the correct synchronization word, and it is not necessary for the signal processing circuit 105 to receive any following data/signal during the second portion of the specific time slot since the following data/signal may be erroneous. That is, the signal processing circuit 105 is arranged to receive the first preamble segment without receiving the second preamble segment when the content match error rate is smaller than a predetermined threshold error rate. Accordingly, the controlling circuit 115 is arranged to adjust the signal processing circuit 105 for reducing power consumption of the signal processing circuit 105. Thus, the signal processing circuit 105 does not listen for or receive the following data/signal during the second portion of the specific time slot. This means that more power can be saved. It should be noted that merely decreasing the power provided to the signal processing circuit 105 during the second portion of the specific time slot without turning off the power also falls within the scope of the present invention.

In a fourth embodiment of the present invention, the predetermined criterion relates to a content match associated with a signal preamble defined in the GSM communication system or the WCDMA communication system. The signal preamble defined above is transmitted prior to data transmission from a transmitter. For example, the signal preamble of the GSM system includes four burst communications. A conventional receiving circuit determines that the following data transmission is activated only when the whole data of the four burst communications is completely and successfully received by the conventional receiving circuit. If the conventional receiving circuit determines that the following data transmission is not activated, then the conventional receiving circuit will not receive any following data or signals. However, determining whether the following data transmission is activated based on the whole data of the burst communications would waste much power.

For reducing power consumption of the signal processing circuit 105 when the signal processing circuit 105 is not required to receive the following signal/data, the signal detector 110 is arranged to detect the first preamble segment (e.g. the first and second bursts) during the first portion of the specific time slot. The controlling circuit 151 then compares the detected first preamble segment with a predetermined preamble segment SEG_PRE'. By comparing the detected first preamble segment with the predetermined preamble segment SEG_PRE', the controlling circuit 115 can check whether the following data/signal is the specified data/signal such as data of the following burst communications defined in the GSM system. That is, if the detected first preamble segment matches the predetermined preamble segment SEG_PRE', then this indicates that the whole signal preamble is the data specified by the communication system. In practice, a few mismatch errors can still be tolerated. The controlling circuit 115 is arranged to perform a content match upon the detected first preamble segment (e.g. data of two burst communications) and the predetermined preamble segment SEG_PRE', to generate a content match error rate.

If the content match error rate is smaller than a predetermined threshold error rate, the controlling circuit 115 determines that the detection result does not meet the predetermined criterion, and is arranged to adjust the signal processing circuit 105 for reducing power consumption of the signal processing circuit 105 during the second portion of the specific time slot. In this situation, the first preamble segment received by the signal processing circuit 105 during the first portion of the specific time slot is determined as a part of the specified data in a communication system (e.g. the data of four burst communications in the GSM system), and therefore the whole signal preamble can be determined to be matched to specified data in the communication system. Thus, it is not required for the signal processing circuit 105 to receive the following second preamble segment to check the whole signal preamble. Accordingly, when the content match error rate mentioned above is smaller than the predetermined threshold error rate, the controlling circuit 115 is arranged to de-activate at least one signal processing function of the signal processing circuit 105 to decrease the power provided to the signal processing circuit 105. Further, merely decreasing the provided power without de-activating any one signal processing function can save power. This also obeys the spirit of the present invention.

Figure 3A:
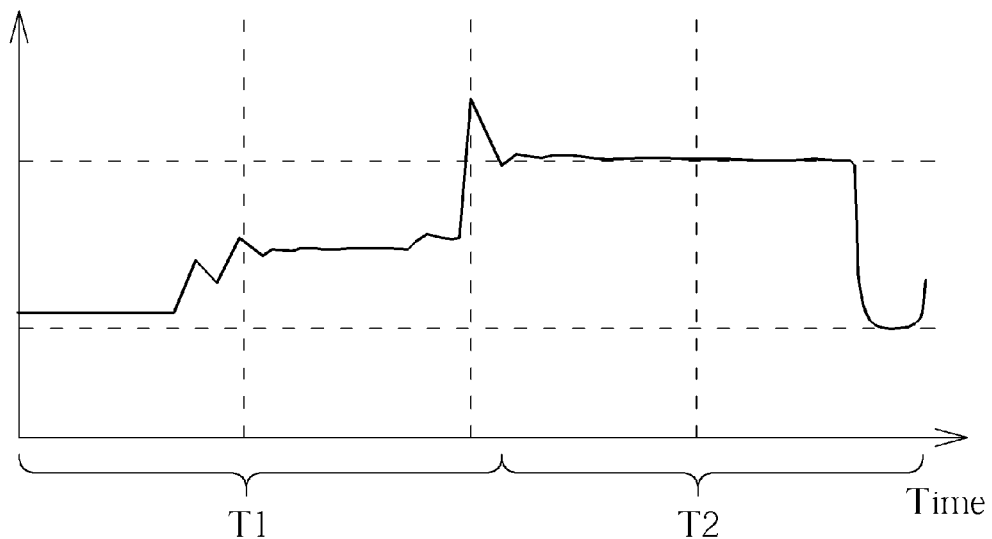
FIG. 3A is a diagram illustrating a waveform indicative of the consumed current during a time slot according to a prior art device.
Figure 3B:
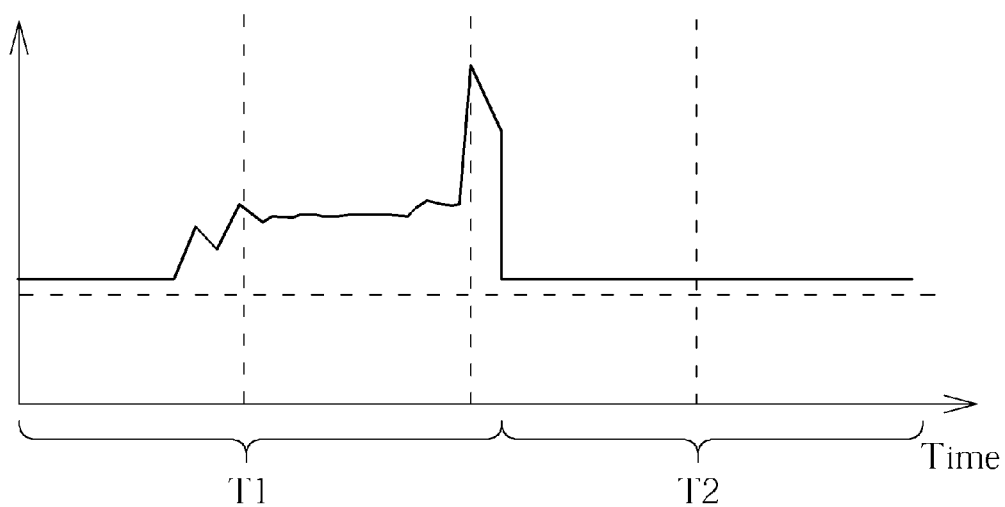
FIG. 3B is a diagram illustrating a waveform indicative of the consumed current during the same time slot according to the apparatus as shown in FIG. 1.

Please refer to FIG. 3A in conjunction with FIG. 3B. FIG. 3A is a diagram illustrating a waveform indicative of the consumed current amounts during a time slot according to a prior art device. FIG. 3B is a diagram illustrating a waveform indicative of the consumed current amounts during the same time slot according to the apparatus 100 as shown in FIG. 1. The time slot comprises the first portion T1 and the second portion T2. As shown in FIG. 3A, whether it is during the first portion T1 or the second portion T2, the prior art device is arranged to listen whether to receive any following data/signal during the whole period of the time slot. Thus, the prior art device consumes a large amount of power; the consumed current amounts are not effectively decreased during the second portion T2. However, the apparatus 100 as shown in FIG. 1 is arranged to de-activate the operation of listening whether to receive any following data/signal at an earlier time during the second portion T2 if the above detection result generated during the first portion T1 does not meet the predetermined criterion. Since de-activating the operation of listening is executed early, the power provided to the signal processing circuit 105 will be decreased or even turned off. As shown in FIG. 3B, during the second portion T2, more power is saved since the consumed current amounts are effectively decreased or even turned off during the second portion T2. It should be noted that comparing the detection result with the predetermined criterion (one operation of the controlling circuit 115) can be executed a plurality of times in one time slot, and comparing the detection result with the predetermined criterion can also be executed regularly or randomly. This depends on design requirements. All these modifications fall within the scope of the present invention.

Figure 1C:
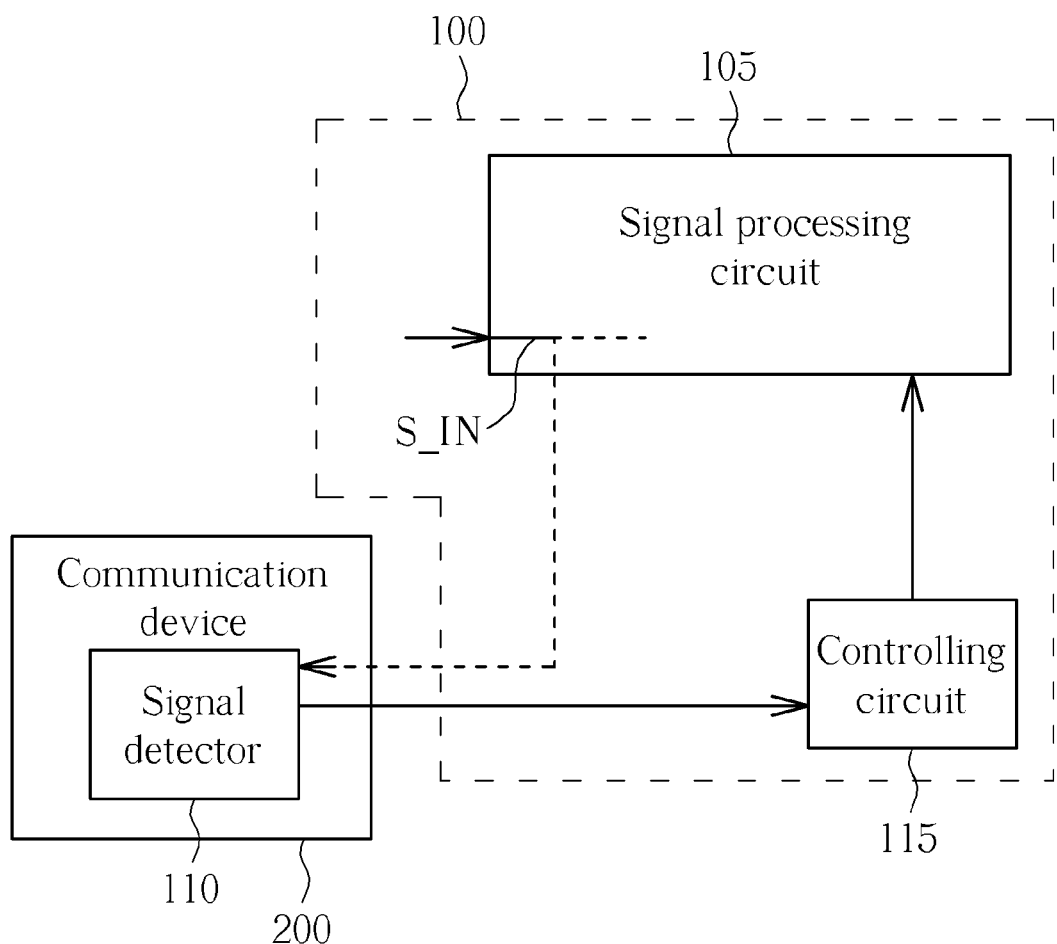
FIG. 1C is a block diagram of an apparatus used in a communication system having a plurality of time slots according to a second embodiment of the present invention.

In addition, it is not required to configure the signal detector 110 and the signal processing circuit 105 as shown in FIG. 1A in the same electronic device or the same integrated circuit. In another embodiment, as shown in FIG. 1C, the signal detector 110 is installed within another communication device 200 such as an adjacent Bluetooth communication device or an arbitration device of the network. The signal detector 110 installed within the communication device 200 shares a detection result with the apparatus 100. Then, the controlling circuit 115 controls the signal processing circuit 105 according to the detection result generated by the signal detector 110 of the communication device 200. The signal detector 110 may generate the detection result based on the input signal S_IN of the apparatus 100 (i.e. the signal processing circuit 105 of the apparatus 100 is arranged to send the input signal S_IN to the apparatus 200 as well); or, the signal detector 110 may generate the detection result based on an input signal of its own. As the apparatus 100 and the apparatus 200 are located adjacently, the received signal quality of the apparatus 200 is referable to the apparatus 100.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus used in a communication system having a plurality of time slots, comprising:
   a signal processing circuit, for receiving an input signal;
   a controlling circuit, coupled to the signal processing circuit, for controlling the signal processing circuit according to a detection result; and a signal detector, coupled to the signal processing circuit and the controlling circuit, for detecting the input signal to generate the detection result;
wherein the detection result is generated based on the input signal; the signal detector is arranged to detect a received signal indicator; when the received signal indicator is smaller than a predetermined threshold value, the controlling circuit determines that the detection result does not meet a predetermined criterion; and when the detection result does not meet the predetermined criterion, the controlling circuit is arranged to adjust the signal processing circuit for reducing power consumption of the signal processing circuit according to the detection result, and the controlling circuit is arranged to de-activate at least one signal processing function of the signal processing circuit.

2. The apparatus of claim 1, wherein the received signal indicator comprises signal strength.

3. The apparatus of claim 1, wherein the predetermined threshold value corresponds to a minimum acceptable value for the signal processing circuit to successfully receive or decode the input signal.

4. The apparatus of claim 1, wherein the predetermined threshold value corresponds to a maximum acceptable noise value.

5. The apparatus of claim 1, wherein the signal detector is arranged to detect a signal preamble, the signal preamble comprising a first preamble segment and a second preamble segment; the signal detector is arranged to detect the first preamble segment; and when a content match error rate between the detected first preamble segment and the predetermined preamble segment is not smaller than an error threshold value, the controlling circuit determines that the detection result does not meet the predetermined criterion, and is arranged to adjust the signal processing circuit for reducing the power consumption of the signal processing circuit.

6. The apparatus of claim 1, wherein when the detection result does not meet the predetermined criterion, the controlling circuit is further arranged to adjust the signal detector for reducing power consumption of the signal detector.

7. The apparatus of claim 1, wherein when the detection result does not meet the predetermined criterion, the controlling circuit is arranged to decrease or turn off power provided to the signal processing circuit.

8. A method used in a communication system having a plurality of time slots, comprising:
using a signal processing circuit to receive an input signal;
generating a detection result by detecting a received signal indicator of the input signal to generate the detection result;
when the received signal indicator is smaller than a predetermined threshold value, determining that the detection result does not meet a predetermined criterion; and
when the detection result generated based on the input signal does not meet the predetermined criterion, adjusting the signal processing circuit for reducing power consumption of the signal processing circuit according to the detection result, and the step of adjusting the signal processing circuit comprises:
de-activating at least one signal processing function of the signal processing circuit.

9. The method of claim 8, wherein the received signal indicator includes signal strength.

10. The method of claim 8, wherein the predetermined threshold value corresponds to a minimum acceptable value for the signal processing circuit to successfully receive or decode the input signal.

11. The method of claim 8, wherein the predetermined threshold value corresponds to a maximum acceptable noise value.

12. The method of claim 8, wherein the detection result is generated by detecting a first preamble segment comprised by the signal preamble included within the input signal where the signal preamble comprises the first preamble segment and a second preamble segment following the first preamble segment; and
adjusting the signal processing circuit for reducing the power consumption of the signal processing circuit when a content match error rate between the detected first preamble segment and the predetermined preamble segment is not smaller than an error threshold value.

13. The method of claim 8, further comprising:
adjusting detection of the input signal for reducing power consumption of the detection of the input signal when the detection result generated during the first portion does not meet the predetermined criterion.

14. The method of claim 8, wherein the step of adjusting the signal processing circuit for reducing the power consumption of the signal processing comprises:
decreasing or turning off power provided to the signal processing circuit when the detection result does not meet the predetermined criterion.

15. A method used in a communication system having a plurality of time slots, comprising:
using a signal processing circuit to receive an input signal; and
when a detection result generated based on the input signal during a first portion of a time slot does not meet a predetermined criterion, adjusting the signal processing circuit according to the detection result in order not to receive the input signal during a second portion of the time slot;
wherein the input signal comprises a first preamble segment corresponding to the first portion of the time slot; the detection result is generated by detecting the first preamble segment comprised by a signal preamble included within the input signal where the signal preamble comprises the first preamble segment and a second preamble segment following the first preamble segment, the second preamble segment corresponding to the second portion of the time slot; the detection result corresponding to a content match error rate between the detected first preamble segment and a predetermined preamble segment and when the detection result corresponding to the first preamble segment does not meet the predetermined criterion and the content match error rate is not smaller than an error threshold value, the signal processing circuit is adjusted so as not to receive a second preamble segment corresponding to the second portion of the time slot.

16. An apparatus used in a communication system having a plurality of time slots, comprising:
a signal processing circuit, for receiving an input signal;
a controlling circuit, coupled to the signal processing circuit, for controlling the signal processing circuit according to a detection result; and
a signal detector, coupled to the signal processing circuit and the controlling circuit, for detecting the input signal to generate the detection result, the signal detector being arranged to detect a signal preamble, the signal preamble comprising a first preamble segment and a second preamble segment, the signal detector being arranged to detect the first preamble segment;

wherein the detection result is generated based on the input signal; when a content match error rate between the detected first preamble segment and the predetermined preamble segment is not smaller than an error threshold value, the controlling circuit determines that the detection result does not meet a predetermined criterion; and, when the detection result does not meet the predetermined criterion, the controlling circuit is arranged to adjust the signal processing circuit for reducing the power consumption of the signal processing circuit according to the detection result, and arranged to de-activate at least one signal processing function of the signal processing circuit.

17. A method used in a communication system having a plurality of time slots, comprising:

using a signal processing circuit to receive an input signal;

generating a detection result by detecting a first preamble segment comprised by a signal preamble included within the input signal where the signal preamble comprises the first preamble segment and a second preamble segment following the first preamble segment; and when the detection result generated based on the input signal does not meet a predetermined criterion and a content match error rate between the detected first preamble segment and a predetermined preamble segment is not smaller than an error threshold value, adjusting the signal processing circuit for reducing power consumption of the signal processing circuit, and the step of adjusting the signal processing circuit comprises:

de-activating at least one signal processing function of the signal processing circuit.

* * * * *